United States Patent
Liu (10) Patent No.: US 8,853,994 B2
(45) Date of Patent: *Oct. 7, 2014

(54) ANALOG PHOTOVOLTAIC POWER CIRCUIT (75) Inventor: Jing-Meng Liu, Jubei (TW)

(73) Assignee: Richtek Technology Corporation, R.O.C., Chupei, Hsin-Chu (TW)

( * ) Notice: Subject to any disclaimer, the term of this patent is extended or adjusted under 35 U.S.C. 154(b) by 490 days.

This patent is subject to a terminal disclaimer.

(21) Appl. No.: 13/373,789

(22) Filed: Dec. 1, 2011

(65) Prior Publication Data
US 2012/0080950 A1 Apr. 5, 2012

Related U.S. Application Data (63) Continuation-in-part of application No. 12/770,080, filed on Apr. 29, 2010, now Pat. No. 8,390,242.

(30) Foreign Application Priority Data

Jun. 22, 2011 (TW) .............................. 100211349 U (51) Int. Cl.
*H01M 10/46* (2006.01)
*G05F 1/67* (2006.01)
*H02J 7/35* (2006.01)

(52) U.S. Cl.
CPC ... *G05F 1/67* (2013.01); *H02J 7/35* (2013.01); Y02E 10/566 (2013.01); Y02E 10/58 (2013.01)
USPC .......................................................... 320/101

(58) Field of Classification Search
CPC ..... H02J 7/0031; H02J 7/0065; H02J 7/0075; H01M 10/46
USPC .......... 320/101, 107, 128, 134, 136; 324/290, 324/291, 293
See application file for complete search history.

(56) References Cited

U.S. PATENT DOCUMENTS

| | | | |
|---|---|---|---|
| 6,984,970 B2 * | 1/2006 | Capel | 323/299 |
| 8,354,820 B2 * | 1/2013 | Liu | 320/101 |
| 8,390,242 B2 * | 3/2013 | Liu | 320/101 |
| 2006/0164065 A1 * | 7/2006 | Hoouk et al. | 324/76.17 |

* cited by examiner

*Primary Examiner* — Edward Tso
(74) *Attorney, Agent, or Firm* — Tung & Associates (57) ABSTRACT

The present invention discloses an analog photovoltaic power circuit, including: a photovoltaic device group for receiving photo energy to generate an input voltage, the input voltage corresponding to an input current; a power stage circuit for receiving the input voltage and generating an output voltage; an optimum current or voltage estimation circuit for receiving a predetermined voltage and estimating an optimum current or voltage point corresponding to an optimal output point according to a direction of variation of the input current and a direction of variation of the power generated by the photovoltaic device group; and an analog comparison and control circuit for comparing the optimum current or voltage with the input current or voltage, to thereby control the operation of the power stage circuit.

32 Claims, 8 Drawing Sheets

ANALOG PHOTOVOLTAIC POWER CIRCUIT

CROSS REFERENCE

The present invention is a continuation-in-part application of U.S. Ser. No. 12/770,080, filed on Apr. 29, 2010 now U.S. Pat. No. 8,390,242, and the present invention also claims priority to TW 100211349, filed on Jun. 22, 2011.

BACKGROUND

1. Field of Invention

The present invention relates to a photovoltaic power circuit, such as a solar cell battery, in particular to a photovoltaic power circuit comprising analog devices, which has a much simpler structure than conventional digital photovoltaic power circuit.

2. Description of Related Art

Figure 1:
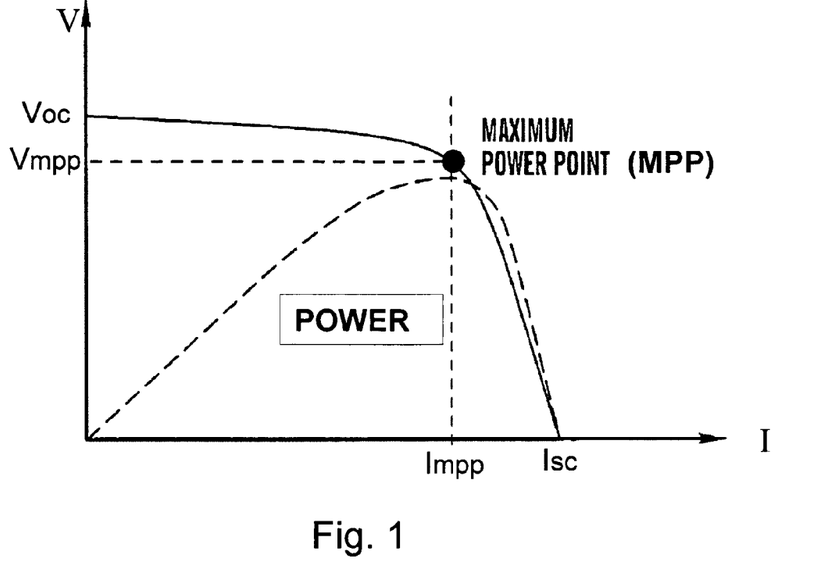
FIG. 1 shows the voltage-current relationship for a photovoltaic device under the same photo energy.

More and more advanced countries are devoting research resources to solar cell batteries, in view of energy crisis. Solar cell batteries belong to the family of photovoltaic power circuits. A photovoltaic power circuit functions by means of the characteristics of semiconductor PN junctions. The PN junctions transfer the received photo energy to electric energy, and charge a battery with the electric energy so that it can generate power. FIG. 1 shows the V-I (voltage-current) relationship for a PN junction diode to generate electric energy, in which the solid line represents the relationship between voltage and current, and the dot line represents the product of voltage and current (V*I), i.e., power. The figure shows only one curve because it is assumed that the received photo energy remains unchanged. If the received photo energy changes, the curve correspondingly changes.

As shown by the curve in FIG. 1, the maximum voltage point Voc is at the open circuit point, while the maximum current point Isc is at the short circuit point. However, the maximum power output point is neither at the maximum voltage point nor at the maximum current point, but at a maximum power point MPP, with corresponding optimum voltage Vmpp and optimum current Impp. Because the received photo energy often keeps varying, prior art digital photovoltaic power circuits have to make complicated calculation, by sophisticated digital circuit, to extract the electric energy at the MPP corresponding to the received photo energy.

Figure 2:
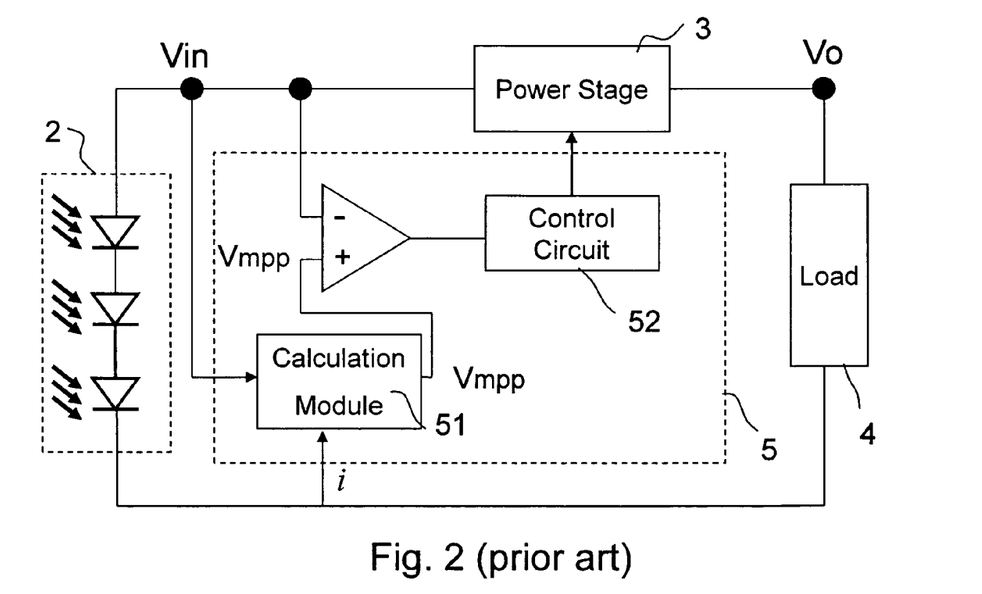
FIG. 2 is a schematic circuit diagram showing a prior art photovoltaic power circuit.

An example of such prior art digital photovoltaic power circuit is disclosed in U.S. Pat. No. 6,984,970, which is shown in FIG. 2 in a simplified form. The voltage Vin generated by a photovoltaic device 2 is converted to output voltage Vout by a power stage 3, to be supplied to a load 4. The load 4 for example can be a charging battery, and the power stage 3 for example can be a boost converter, a buck converter, an inverter, a fly-back converter, etc. To keep the power stage 3 extracting electric energy at the MPP, a digital controller 5 is provided in the circuit, which includes a digital calculation module 51 (e.g., a digital microcontroller) that keeps multiplying the value of the voltage Vin with the value of the extracted current I to obtain the MPP, and further calculates the optimum voltage Vmpp based on the obtained MPP. The calculated voltage Vmpp is compared with the input voltage Vin, and the comparison result drives a controller circuit 52 to control the power stage 3. The digital controller 5 shown in FIG. 2 is very sophisticated; it requires a huge number of transistors, and it requires analog-to-digital converters (ADC) to capture voltage and current signals. Inevitably, this increases difficulties and cost of the circuit and its design.

Another prior art digital photovoltaic power circuit is disclosed in US Patent Publication No. 2006/0164065. This prior art only briefly explains the idea that the circuit includes a search mode and a dithering mode. In the initial search mode, the circuit sweeps the voltage-current curve to find the MPP; thereafter, it enters the dithering mode in which it operates according to the current value corresponding to the MPP, and periodically samples and updates the vale (for details, please refer to paragraphs 0008, 0010, 0033 and FIG. 5 of the patent publication). However, this cited patent publication does not explain how it "sweeps" to find the MPP.

Although there is no detailed circuit structure illustrating how it sweeps, it can be seen from the description relating to the search mode and the sweeping process that this cited patent publication, even if it does not require multiplication of multiple voltage and current values (in fact one cannot see how it omits such complicated calculation from the specification of this cited patent publication), requires many digital circuits such as memories or registers and comparators; otherwise it can not select and memorize the maximum power point MPP. In addition to the complexity of the circuit, the sweeping process proposed by this cited patent publication occupies effective operation time of the circuit. Moreover, if light intensity changes after initialization, causing the photovoltaic device to deviate from the original voltage-current curve, the circuit has to reinitiate the search mode with the sweeping process, which is very inefficient.

In brief, US Patent Publication No. 2006/0164065 requires a complicated circuit and an inefficient process to find the MPP point, so that it can operate in the dithering mode in an analogous manner. Obviously this is disadvantageous.

SUMMARY

In view of the foregoing, it is desirous, and thus an object of the present invention, to provide an analog photovoltaic power circuit that improves the drawbacks in prior art.

To achieve the above and other objects, in one aspect of the present invention, an analog photovoltaic power circuit, comprising: a photovoltaic device group for receiving photo energy and generating an input voltage, the input voltage corresponding to an input current; a power stage for receiving the input voltage and generating an output voltage; an optimum current point estimation circuit receiving a predetermined voltage, and estimating an optimum current point corresponding to an optimal power output point according to a direction of variation of the input current and a direction of variation of power generated by the photovoltaic device; and an analog comparison and control circuit for controlling an operation of the power stage according to a comparison between the optimum current point estimated by the optimum current point estimation circuit and the input current.

In another aspect of the present invention, it provides an analog photovoltaic power circuit, comprising: a photovoltaic device group for receiving photo energy and generating an input voltage, the input voltage corresponding to an input current; a power stage for receiving the input voltage and generating an output voltage; an optimum voltage point estimation circuit for receiving a predetermined voltage and estimating the optimum voltage point corresponding to an optimal power output point according to a direction of variation of the input current and a direction of variation of power generated by the photovoltaic device group; and an analog comparison and control circuit for controlling an operation of the power stage according to a comparison between the optimum voltage point and the input voltage.

In yet another aspect of the present invention, it provides an analog photovoltaic power circuit, comprising: a photovoltaic device group for receiving photo energy and generating an input voltage, the input voltage corresponding to an input current; a power stage for converting the input voltage to an output voltage which is supplied to a load; an optimum current point estimation circuit receiving a predetermined voltage, and estimating an optimum current point corresponding to an optimal power output point according to a direction of variation of the input current and a direction of variation of power generated by the photovoltaic device, wherein the direction of variation of power is obtained from a power-variation-direction indication circuit which generates a signal indicating the direction of variation of the power; and an analog comparison and control circuit for controlling an operation of the power stage according to a comparison between the optimum current point estimated by the optimum current point estimation circuit and the input current.

In still yet another aspect of the present invention, it provides an analog photovoltaic power circuit, comprising: a photovoltaic device group for receiving photo energy and generating an input voltage, the input voltage corresponding to input current; a power stage for converting the input voltage to an output voltage which is supplied to a load; an optimum voltage point estimation circuit receiving a predetermined voltage, and estimating an optimum voltage point corresponding to an optimal power output point according to a direction of variation of the input current and a direction of variation of power generated by the photovoltaic device, wherein the direction of variation of the power is obtained from a power-variation-direction indication circuit which generates a signal indicating the direction of variation of the power; and an analog comparison and control circuit for controlling an operation of the power stage according to a comparison between the optimum voltage point and the input voltage.

These and other features, aspects, and advantages of the present invention will become better understood with reference to the following description, appended claims, and accompanying drawings.

DESCRIPTION OF THE PREFERRED EMBODIMENTS

The key feature of the present invention is that it uses analog circuit devices, which are much simpler than the devices in prior art, to calculate the optimum current point Impp in a photovoltaic power circuit. The circuit according to the present invention is thus called "analog photovoltaic power circuit". However, it should be understood that the term "analog photovoltaic power circuit" only means that the key functions of the circuit are achieved by analog devices; it does not mean that all of the circuit devices have to be analog devices.

Figure 3:
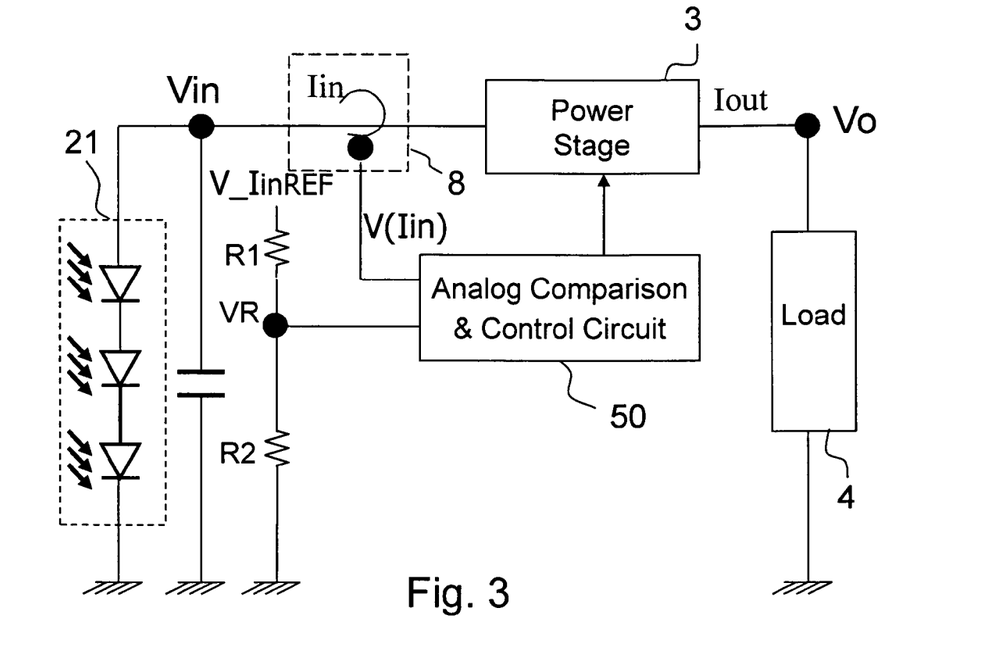
FIG. 3 is a schematic circuit diagram showing a first embodiment according to the present invention.

Referring to FIG. 3, it is a schematic circuit diagram showing a first embodiment according to the present invention. As shown in the figure, this embodiment includes a photovoltaic device group 21 which generates electric energy. The voltage generated by the photovoltaic device group 21 is supplied to a power stage 3 as its input voltage Vin; the power stage 3 for example can be a boost converter, a buck converter, an inverter converter, or a fly-back converter, etc. The power stage 3 is controlled by an analog comparison and control circuit 50, to receive energy from its input terminal and supply an output current Iout to its output terminal so that an output voltage Vo is generated and supplied to a load. In this embodiment, the analog comparison and control circuit 50 locks the input current Iin at the optimum current point Impp corresponding to the maximum power point MPP (as shown in FIG. 1), in a manner described below.

A current detection circuit 8 receives information related to the input current Iin, and generates a corresponding voltage signal V(Iin) which is sent to the analog comparison and control circuit 50. (The above is only an example; the input current Iin can be represented by any form, such as a current signal). On the other hand, information related to a short circuit current Isc (referring to FIG. 1) can be obtained from the photovoltaic device group 21, and V_IinREF is a voltage signal representing the short circuit current Isc (examples for obtaining the V_IinREF will be described in FIGS. 15-16). Of course Isc can also be represented by a current mode signal, but since the spirit is exactly the same, the description of this invention uses only voltage mode signal in the embodiments to avoid duplication. The ratio between the resistor R1 and the resistor R2 are properly arranged so that the relationship between the voltage at the node VR and the voltage V_IinREF is substantially equal to the relationship between the optimum current point Impp and the short circuit current Isc (such as 65%-85%).

Preferably, the voltage at the node VR and a voltage signal representing the input current Iin are compared in the analog comparison and control circuit 50, and the comparison result controls the power stage 3 to receive power from its input terminal. When the voltage signal representing the input current Iin is larger than the voltage at the node VR, the power stage 3 reduces the current it extracts from its input terminal; when the voltage signal representing the input current Iin is smaller than the voltage at the node VR, the power stage 3 increases the current it extracts from its input terminal. Thus, by mechanism of comparison and feedback control, the voltage signal representing the input current Iin will be locked corresponding to the voltage at the node VR, so that the input current Iin is approximately at the optimum current point Impp. In this way, the power stage 3 works at its optimum operation point, to receive maximum power.

Figure 4:
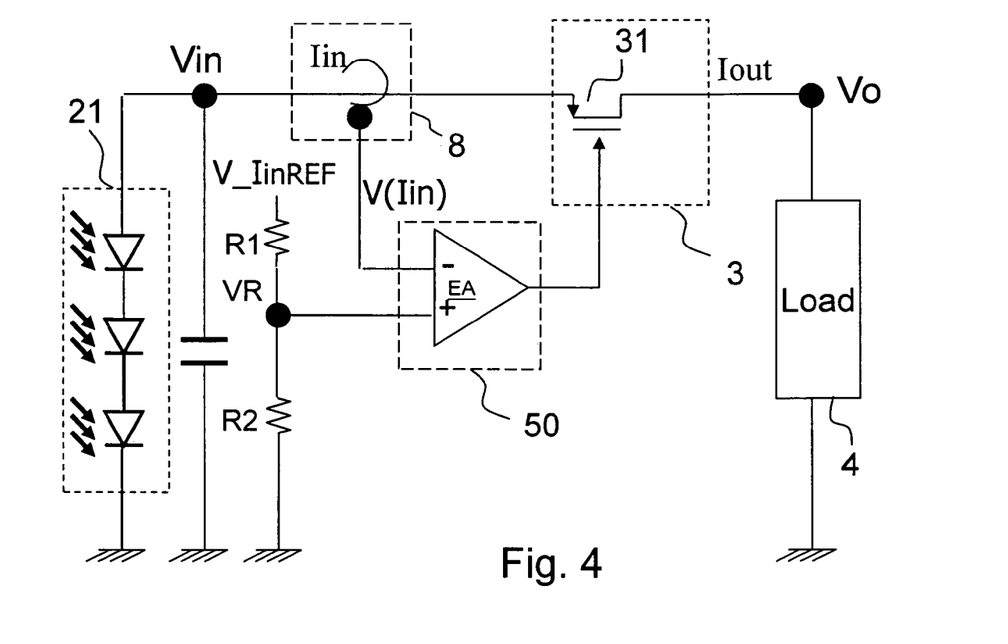
FIG. 4 is a schematic circuit diagram showing a second embodiment according to the present invention.

The analog comparison and control circuit 50 can be embodied by a very simple linear regulator, as referring to the second embodiment shown in FIG. 4. In this embodiment, an analog output from the error amplifier EA controls a power transistor 31 of the power stage 3. The conduction of the power transistor 31 follows the analog output from the error amplifier EA, and the conduction decides the current to be extracted from the photovoltaic device group 21.

There is power loss in a linear regulator. To avoid it for better efficiency, the linear regulator can be replaced by a switching regulator, such as, using a PWM (pulse width modulation) circuit in the analog comparison and control circuit 50. The details of a PWM circuit and how it regulates voltage are not explained here for that they are known by one skilled in this art. It should be noted that the use of a PWM circuit is not the only approach; other modulation circuits such as PFM (pulse frequency modulation) circuit can be used in the analog comparison and control circuit 50.

Figure 5:
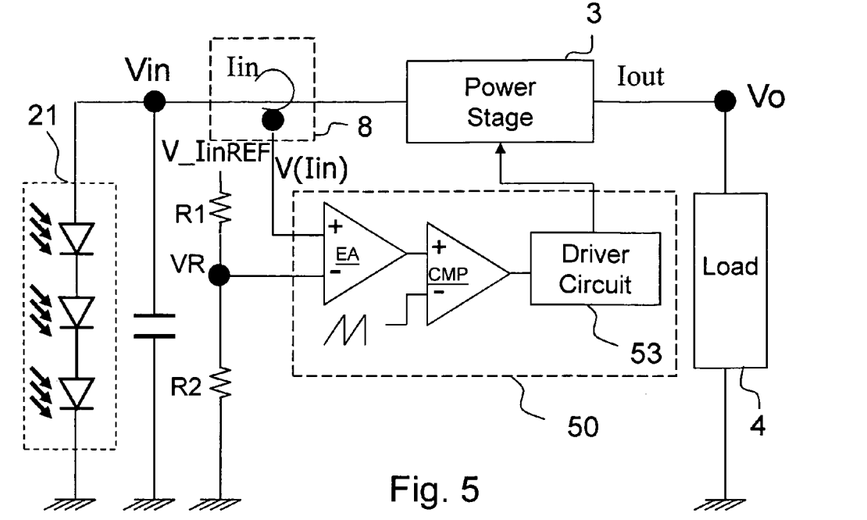
FIG. 5 is a schematic circuit diagram showing a third embodiment according to the present invention.

As an example, please refer to FIG. 5, which is the third embodiment according to the present invention. In this embodiment, the analog comparison and control circuit 50 includes an error amplifier EA, which receives the voltage at the node VR as its reference voltage, and receives the voltage signal representing the input current Iin as the feedback voltage, and compares them with each other. The result of comparison is inputted to a comparator CMP, to be compared with a sawtooth wave. A driver circuit receives the output from the comparator CMP, to generate a signal for driving the power stage 3.

It should be noted that the above-mentioned example is only one possible arrangement; there are other arrangements to achieve the same or similar purpose. The key point is to control the power stage 3 to extract power according to the comparison between the voltage at the node VR and the voltage signal representing the input current Iin, in which the voltage at the node VR (corresponding to Impp) can be obtained by a simple voltage divider circuit, without complicated digital calculation module.

Under the above teaching, those skilled in this art can readily think of many variations. For example, the resistors R1 and R2 can be replaced by other devices having suitable DC resistances. Moreover, the analog comparison and control circuit 50 can directly compare the current signals (for example, the short circuit current Isc, the optimum current Impp, and the input current Iin can be in the form of current mode signals) to generate a control signal. All such variations should fall within the scope of the present invention.

Figure 6:
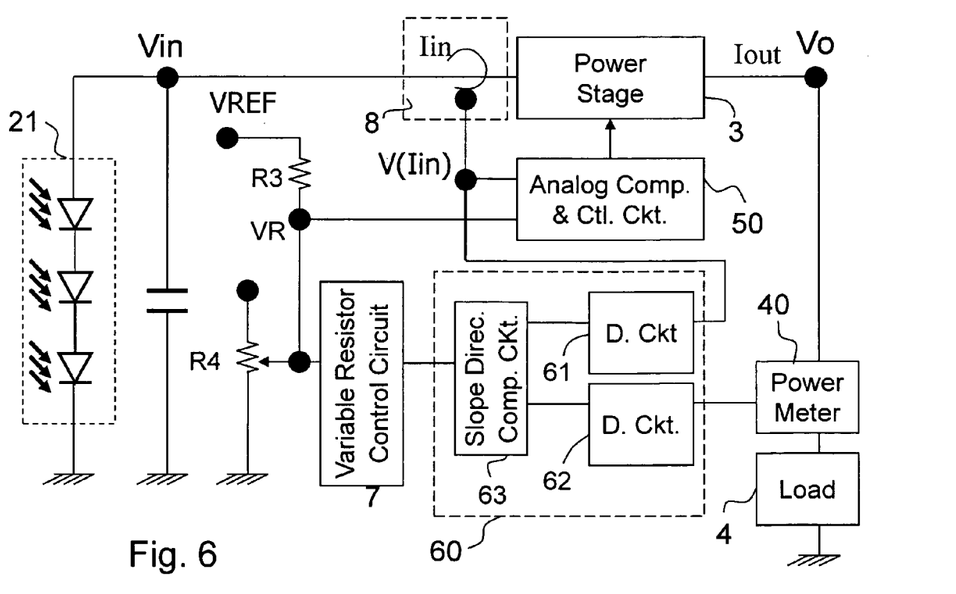
FIG. 6 is a schematic circuit diagram showing a fourth embodiment according to the present invention.

FIG. 6 shows the fourth embodiment according to the present invention. In this and following embodiments, the analog comparison and control circuit 50 is shown as a simple block without showing its details, for simplicity of the drawings. The reference voltage VREF in this embodiment can be a proper fixed voltage, a voltage extracted from the output of the photovoltaic device group 21, or a voltage extracted from a reference photovoltaic device group (to be shown in FIGS. 15-16), or a predetermined voltage. A fixed resistor R3 and a variable resistor R4 form a variable voltage divider circuit which divides the reference voltage VREF to determine the voltage at the node VR; in other words, the resistance of the variable resistor R4 determines the voltage at the node VR, such that the voltage at the node VR corresponds to the optimum current Impp. It should be noted that the variable resistor R4 is only one among many usable devices; any other device with variable resistance, even if its resistance does not vary linearly, can be used for the purpose of the present invention, such as a MOSFET, a JFET, a pinch-resistor, etc. And there are still many other methods for deriving VR, for example the VREF can be changed to a current mode reference signal IREF, and then VR=IREF×R4, which can achieve the same purpose. The key point is to adjust the voltage at the node VR, either by the variable voltage divider circuit or by other means such as by providing a current flowing through the variable resistor R4 (or any variable resistance device); any arrangement serving this purpose meets the requirement of the present invention. Further, because the resistances of the resistors R3 and R4 can be properly designed, the reference voltage VREF is not necessarily equal to the voltage V_IinREF corresponding to the short circuit current Isc (certainly, it is OK if they are equal).

The resistance of the variable resistor R4 is controlled by a variable resistor control circuit 7 in a manner as follows. Referring to FIG. 1, at the left side of the MPP on the V-I curve, when current increase, power increase, they change in the same directions; at the right side of the MPP on the V-I curve, when current increases, power decrease, they change in opposite directions. Thus, by a comparison between the changing direction (also named as the slop direction) of the output current (corresponding to the input current Iin) and the changing (slope) direction of the output power of the photovoltaic device group 21, it can be decided as to where the present V-I relationship stands, i.e., at the left side or right side of the MPP. The resistance of the variable resistor R4 can be adjusted accordingly to move the voltage at the node VR towards the voltage corresponding to the optimum current point Impp. Under this concept, in the circuit of FIG. 6, a direction comparison circuit 60 is provided, which receives the input current Iin (in a form of voltage signal V (Iin)) corresponding to the output current of the photovoltaic device group 21 and the power at the output terminal (corresponding to the output power of the photovoltaic device group 21), and compares their slope directions. The comparison result is sent to the variable resistor control circuit 7 for adjusting the resistance of the variable resistor R4.

To adjust the voltage VR by means of a variable resistor control circuit 7 controlling the resistance of a variable resistor R4, is only an illustrative embodiment to show the concept. The spirit is to provide a circuit for adjusting the voltage VR according to a comparison between slope directions of current and power. When the slope directions are the same to each other, the circuit increases the voltage VR; when the slope directions are opposite to each other, the circuit decreases the voltage VR. Any variation under this spirit falls within the scope of the present invention.

There are many ways to embody the direction comparison circuit 60, one of which is shown in the figure as an example. A power meter 40 at the right side of the figure measures the power at the output terminal (corresponding to the output power of the photovoltaic device group 21), and sends the measured result to a differential circuit (D. Ckt.) 62; the output of the derivative circuit 62 represents the slope of the power at the output terminal. On the other hand, another differential circuit (D. Ckt.) 61 receives the voltage signal representing the input current Iin (in this embodiment, the voltage signal is the voltage V (Iin)) and generates an output representing the slope of the input current Iin (corresponding to the slope of the output current of the photovoltaic device group 21). A slope direction comparison circuit (Slope Direct. Comp. Ckt.) 63 receives the outputs from the circuits 61 and 62, and compare the directions of the two slopes. The comparison result is sent to the variable resistor control circuit 7 for adjusting the resistance of the variable resistor R4.

Figure 7:
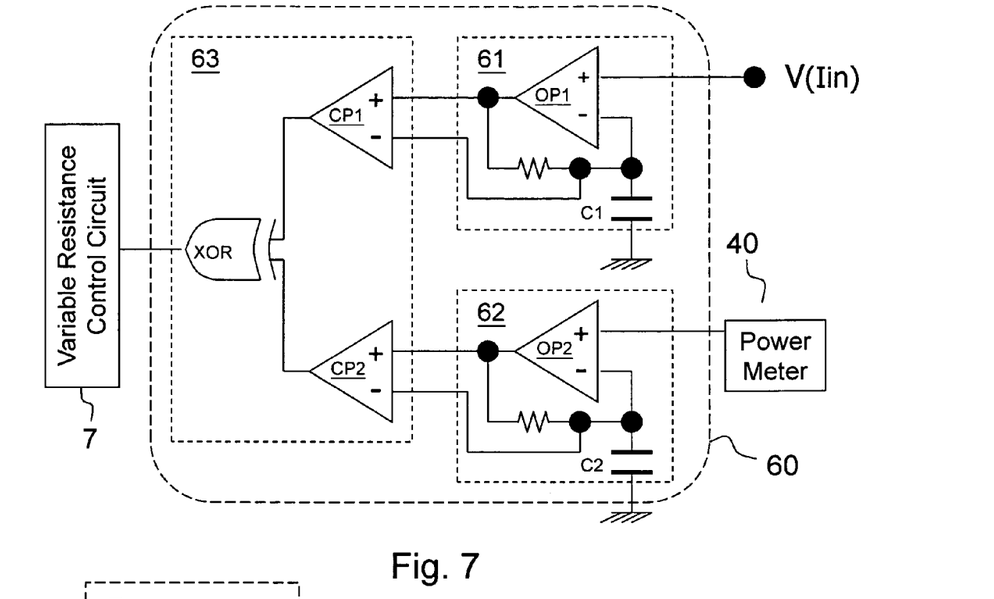
FIG. 7 is a schematic circuit diagram showing a fifth embodiment according to the present invention.
Figure 11:
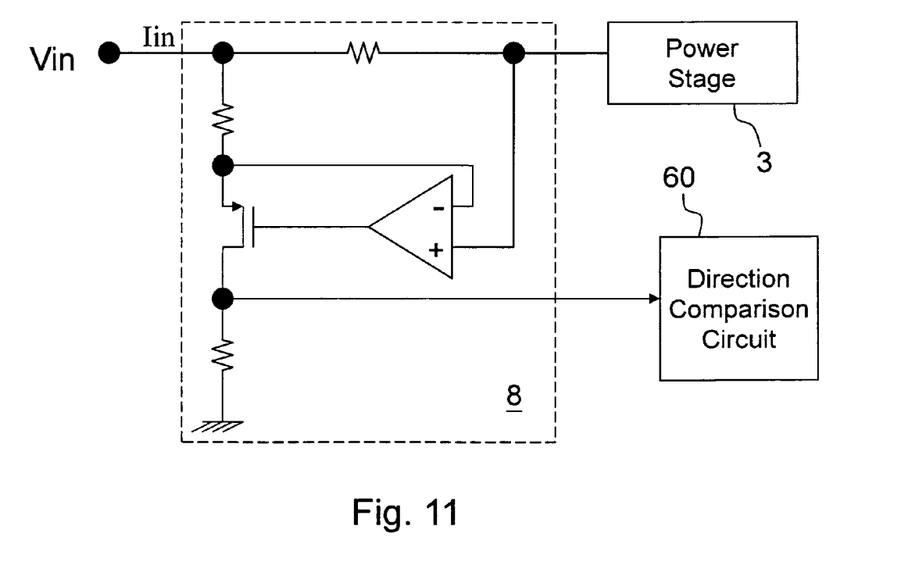
FIG. 11 shows an example for embodying a current detection circuit.

The fifth embodiment shown in FIG. 7 shows an example of detailed structure of the direction comparison circuit 60. It includes operational amplifiers OP1 and OP2, and comparators CP1 and CP2. The comparators CP1 and CP2 respectively compare the outputs of the operational amplifiers OP1 and OP2 with the voltage stored in the capacitors C1 and C2 at a previous time point, and determine the slope directions. The output of the exclusive OR gate XOR indicates whether the slope directions are the same or opposite. It should be noted here that what FIG. 11 shows is only one example among many possible arrangements, which is not intended to limit the scope of the present invention. For instance, the differential circuits 61 and 62 in FIGS. 6 and 7 can be replaced by other high pass filter circuits to obtain the same effect. This is because, under the concept of the present invention, it is not required to obtain accurate values of the slopes, but instead only the slope directions of the output current and the output power of the photovoltaic device group 21. As another example, the function of the comparators CP1 and CP2 is to transfer the outputs of the operational amplifiers OP1 and OP2 to digital signals for inputting into the exclusive OR gate XOR. If the operational amplifiers OP1 and OP2 are designed so that their outputs can be distinguished and recognized by a logic operation circuit, the slope direction comparison circuit 63 does not have to include the comparators CP1 and CP2; the outputs of the operational amplifiers OP1 and OP2 can be compared with each other directly.

Figure 8:
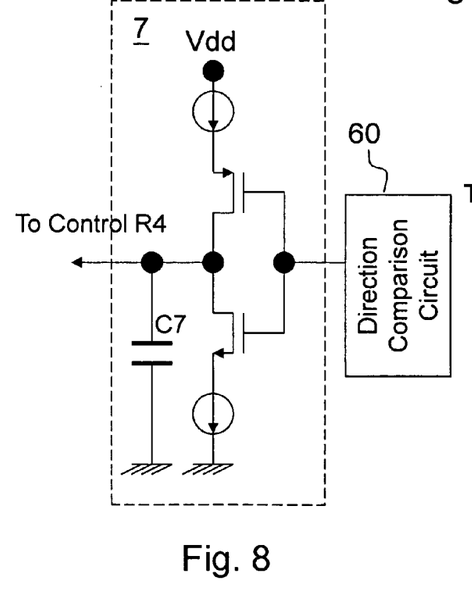
FIG. 8 is a schematic circuit diagram showing a sixth embodiment according to the present invention.
Figure 9:
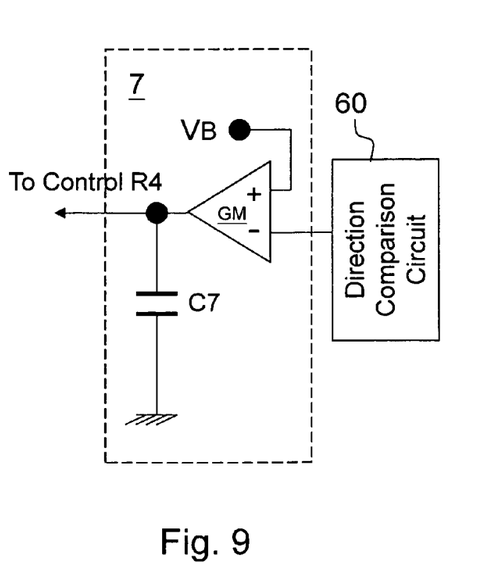
FIG. 9 is a schematic circuit diagram showing a seventh embodiment according to the present invention.

FIGS. 8 and 9 show two examples of the detailed structure of the variable resistor control circuit 7, which are the sixth and seventh embodiments of the present invention. Again, these two embodiments are illustrative rather than limiting. In details, in the embodiment shown in FIG. 8, when the output of the direction comparison circuit 60 is low, the upper PMOS switch is ON, so that the capacitor C7 is charged along a positive direction and adjust the variable resistor R4 corresponding to the positive direction; when the output of the direction comparison circuit 60 is high, the lower NMOS switch is ON, so that the capacitor C7 is discharged along a negative direction and adjust the variable resistor R4 corresponding to the negative direction. The foregoing "positive" and "negative" directions, the types and locations of the PMOS and NMOS transistors, and the adjusted directions of the variable resistor R4, can be arranged according to the design of the direction comparison circuit 60, and the relationship between R4 and VR. For example, if the exclusive OR gate XOR is replaced by an exclusive NOR gate XNOR, then opposite signals and devices should be used.

The embodiment of FIG. 9 includes a transconductor GM which generates current corresponding to the comparison between the output of the direction comparison circuit 60 and a reference voltage VB, to charge or discharge the capacitor C7 for controlling the variable resistor R4. The reference voltage VB can be set at a value between the high level and low level of the output of the direction comparison circuit 60, so that, when the output of the direction comparison circuit 60 is low, the transconductor GM generates positive current to charge the capacitor C7 along a positive direction and adjust the variable resistor R4 corresponding to the positive direction; when the output of the direction comparison circuit 60 is high, the transconductor GM generates negative current to discharge the capacitor C7 along a negative direction and adjust the variable resistor R4 corresponding to the negative direction. Similar to the previous embodiment, the "positive" and "negative" directions (the positive and negative inputs of the transconductor GM) can be arranged according to the output types of the direction comparison circuit 60, and the relationship between R4 and VR, i.e., they may be reversed if needed.

Referring to FIG. 1 again, to determine MPP based on the current-power relationship, the parameter of the photovoltaic device group 21 under control can be the output current or the output voltage of the photovoltaic device group 21.

Figure 10:
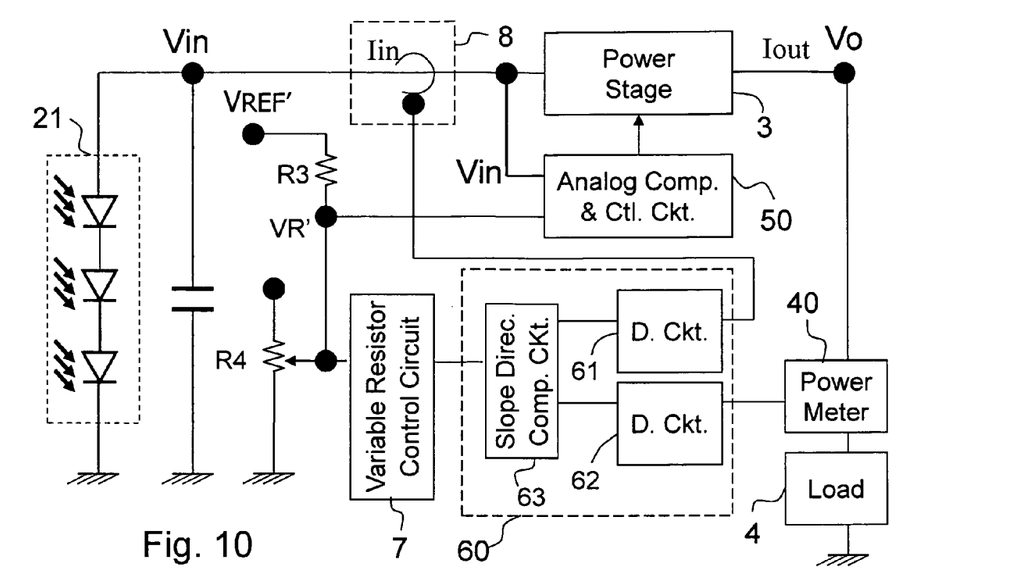
FIG. 10 is a schematic circuit diagram showing an eighth embodiment according to the present invention.

In the embodiment shown in FIG. 10, a current sensing circuit 8 senses the input current Iin (the output current of the photovoltaic device group 21), which is compared with the output of the power meter 40 (the output power of the photovoltaic device group 21) in the direction comparison circuit 60. The resistance of the variable resistor R4 is adjusted according to the result of comparison, to move the voltage VR' divided from the reference voltage VREF' at the node VR towards a voltage corresponding to the optimum current point Impp. The output voltage of the photovoltaic device group 21 corresponding to the optimum current point Impp will be the optimum voltage Vmpp. The analog comparison and control circuit 50 locks Vin at Vmpp by a feedback control mechanism, and this achieves the same effect. Apparently, because the relationship between current and power slope directions is opposite to the relationship between voltage and power slope directions, the detailed structure of the direction comparison circuit 60 or the variable resistor control circuit 7 should be designed based on such fact. For example, if a circuit shown in any of FIGS. 7-9 is used, an inverter gate should be added at a proper location, or an exclusive NOR gate XNOR should be used instead of the exclusive OR gate XOR, or the locations of the PMOS and NMOS transistors in FIG. 8 should be interchanged, or the positive and negative inputs of the transconductor GM in FIG. 9 should be interchanged, etc.

The same as above, to adjust the voltage VR (VR') by means of a variable resistor control circuit 7 controlling the resistance of a variable resistor R4, is only an illustrative embodiment to show the concept. The spirit is to provide a circuit for adjusting the voltage VR (VR') according to a comparison between slope directions of current and power. When the output voltage of the photovoltaic device group 21 is to be controlled and the slope directions of current and power are opposite to each other, the circuit increases the voltage VR'; when the slope directions are the same to each other, the circuit decreases the voltage VR'. When the output current of the photovoltaic device group 21 is to be controlled and the slope directions of current and power are opposite to each other, the circuit decreases the voltage VR; when the slope directions are the same to each other, the circuit increases the voltage VR. Any variation under this spirit falls within the scope of the present invention.

There are many ways to embody the current sensing circuit 8, one of which is shown in FIG. 11. The circuit shown in FIG. 11 senses the current Iin and converts it to a voltage signal to be sent to the direction comparison circuit 60. Again, this embodiment is for illustration, not for limitation.

Figure 12:
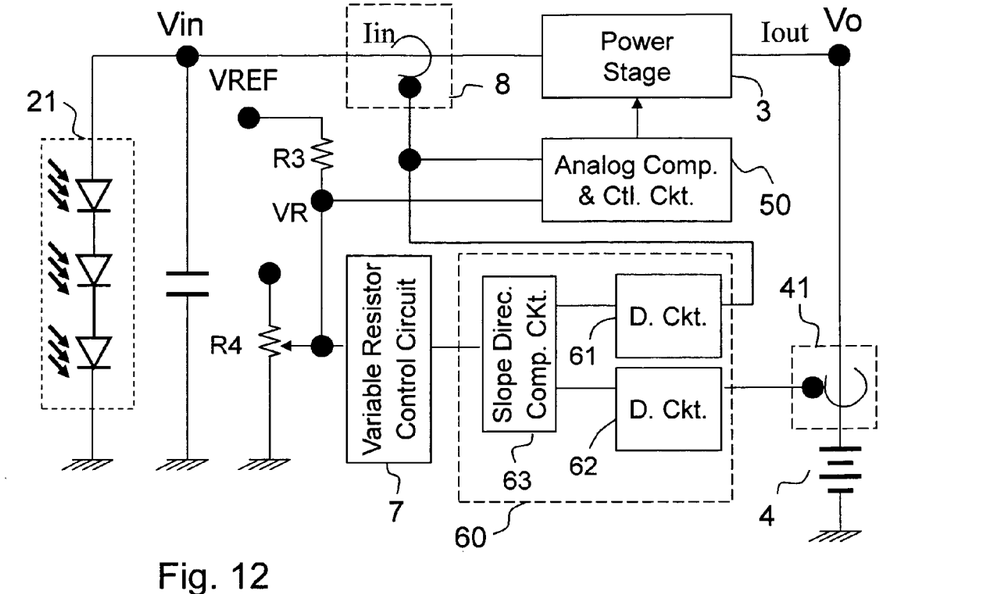
FIG. 12 is a schematic circuit diagram showing a ninth embodiment according to the present invention.

A power meter 40 is used in the embodiments of FIGS. 6, 7 and 10. From a first sight, the use of a power meter complicates the circuit, because a power meter needs to measure and calculate the product of current and voltage values. Actually, under the concept of the present invention, it does not require an accurate measurement of power, and thus it does not require a sophisticated power meter. What is required is only to know the direction of changes of the output power of the photovoltaic device group 21; therefore, it is sufficient to use a very simple power meter (as described later with reference to FIGS. 13 and 14), or even without a power meter. FIG. 12 shows the ninth embodiment of the present invention, which is a variation based on the embodiment of FIG. 10. As shown at the right side of the figure, since the load 4 is a battery in most cases, and the voltage of a battery changes very slowly, the power meter 40 can be replaced by a current sensing circuit 41 which only measures the current flowing to the load 4, and transfers the sensed result to a voltage signal to be inputted to the differential circuit 62. Thus, the same purpose as that of the circuit shown in FIG. 10 can be achieved. An example of the detailed structure of the current sensing circuit 41 is shown in FIG. 11. Likewise, the right side of FIG. 6 or FIG. 7 can be replaced by a current sensing circuit in a similar fashion.

Figure 13:
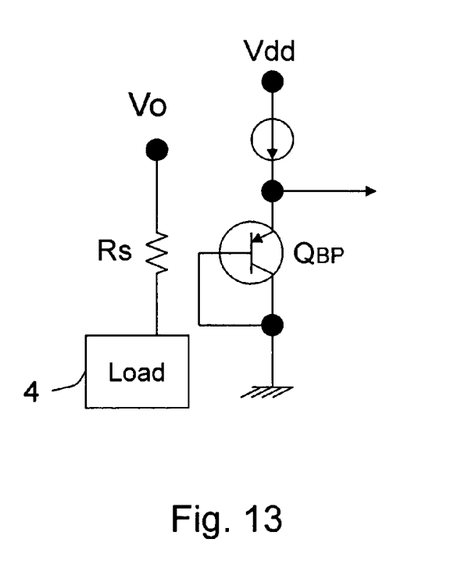
FIG. 13 is a schematic circuit diagram showing a tenth embodiment according to the present invention.

If it is desired to take the voltage variation of the load 4 into consideration, we can use a "power trend meter" having a much simpler structure, instead of a power meter. A power trend meter compares the power at the present time point with the power at a previous time point, and generates a signal corresponding to the comparison result. It should be emphasized that the power trend meter only needs to show the direction of power changes, which does not even need to be proportional to the actual power changes. An example of such power trend meter is shown in FIG. 13 as the tenth embodiment of the present invention, wherein the power trend is estimated by sensing the heat of a resistor. As shown in the figure, a bipolar transistor $Q_{BP}$ is used to sense the heat variation on a resistor Rs. In general, the base to emitter voltage variation ($dV_{BE}$) of a bipolar transistor corresponds to temperature variation (dT) as:

$$dV_{BE}/dT \approx -2 \text{ mV}/^\circ \text{C.}$$

Thus, the voltage variation can be used to represent the power trend. However, it should be noted that this is an inverted analog signal and should be processed accordingly.

Figure 14:
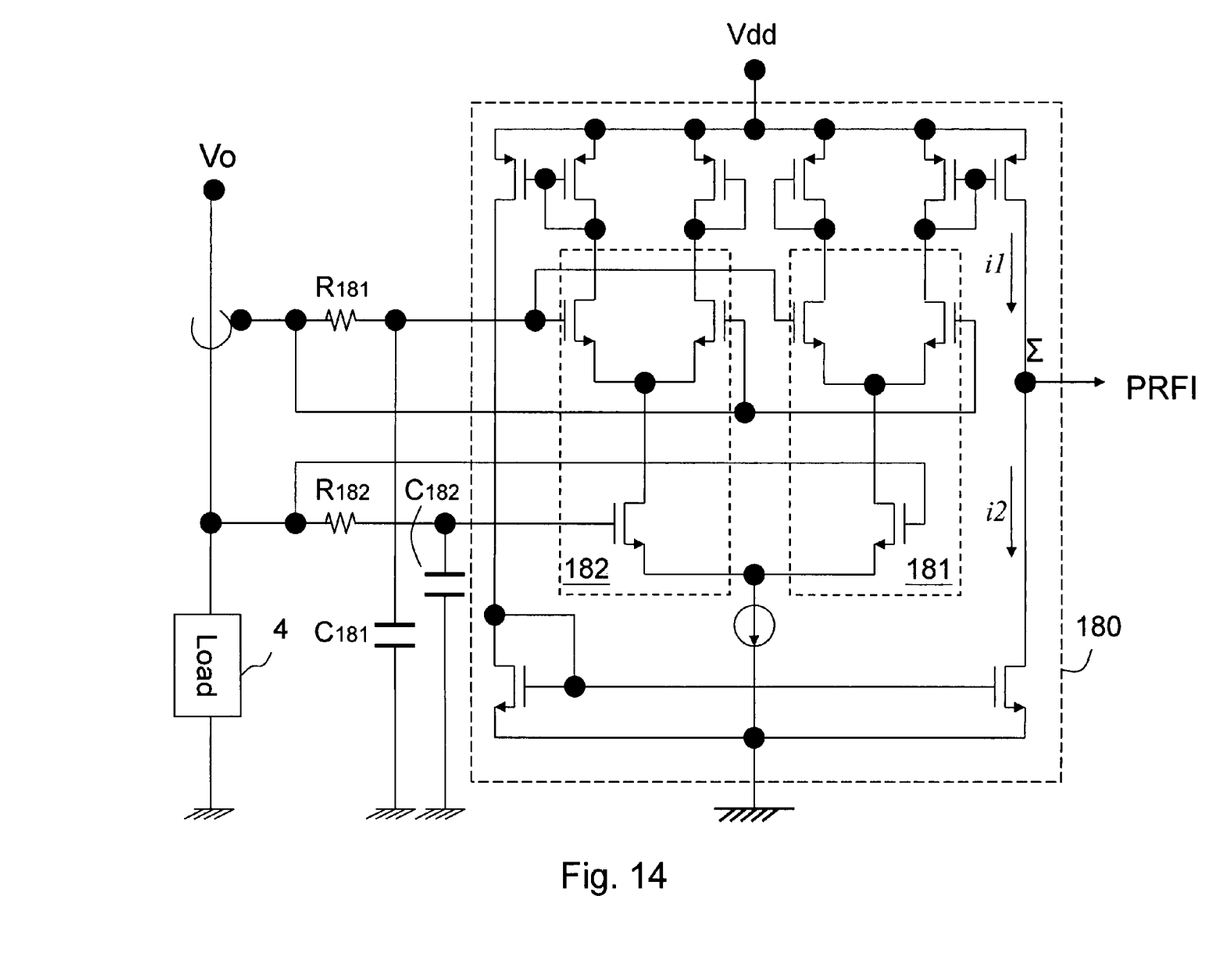
FIG. 14 is a schematic circuit diagram showing an eleventh embodiment according to the present invention.

If it is not desired to simply measure the power trend by a thermometer as above, the eleventh embodiment of the present invention shown in FIG. 14 provides a simple solution. Please refer to FIG. 7 in conjunction with FIG. 14, the circuit of FIG. 14 equivalently includes the power meter 40, the differential circuit 61, and the comparator CP2. In detail, the circuit in FIG. 14 includes a first RC circuit (R181, C181) receiving a first delay signal related to a current supplied to the load; a second RC circuit (R182, C182) receiving a second delay signal related to a voltage supplied to the load; and an analog circuit 180 determining the direction of variation of the power according to the first delay signal, the second delay signal, a signal related to the current supplied to the load and a signal related to the voltage supplied to the load. The analog circuit 180 compares two products according to their relative values (the following descriptions are based on relative values instead of absolute values), wherein the analog circuit 180 includes a first multiplier 181 for generating a first derived signal i1 related to a product of the current and the voltage of the load; a second multiplier 182 for generating a second derived signal i2 related to a product of the first delay signal and the second delay signal; and a summing node E for comparing the first derived signal i1 and the second derived signal i2 to determine the direction of variation of power and generate a signal PRFI indicating the power changing direction, i.e., the plus or minus sign of d(V*I)/dt, in which d(V*I) is the power change, and dt is the time change.

Figure 15:
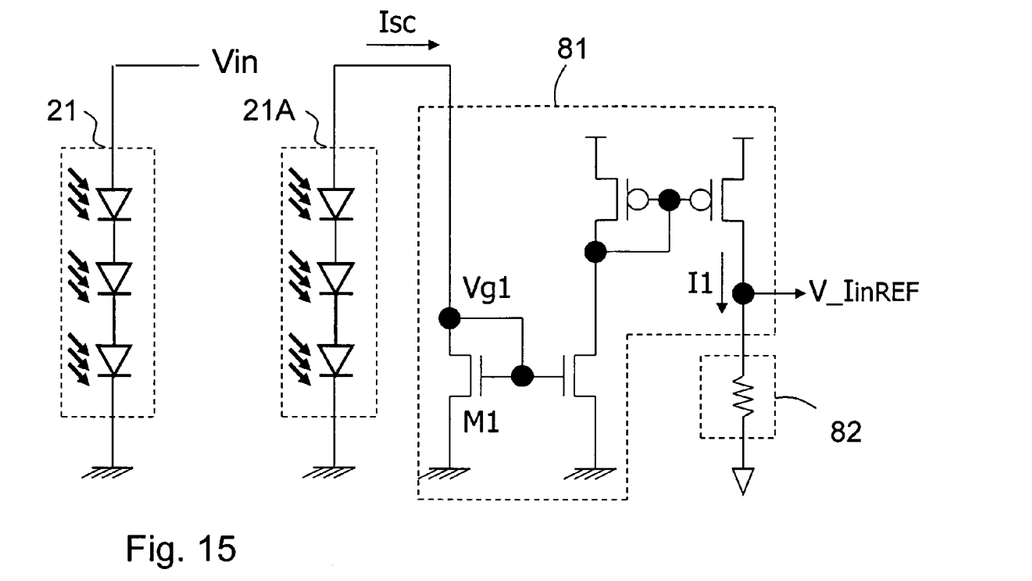
FIGS. 15 and 16 show how to obtain a representative voltage V_IinREF according to a short circuit current Isc of a photovoltaic device group 21.

Please refer to FIG. 15. There are many ways to obtain the voltage V_IinREF (representing the short circuit current Isc) according to the short circuit current Isc of the photovoltaic device group 21. For example, a reference photovoltaic device group 21A can be provided (the number of the photodiode devices of the reference photovoltaic device group 21A can be the same or proportional to the number of the photodiode devices of the photovoltaic device group 21, depending on the setting of the representative voltage V_IinREF). The reference photovoltaic device group 21A is in a short circuit state for generating the short circuit current (or a ratio thereof). A current mirror 81 mirrors the short circuit current Isc to generate a current I1. Likely, the current I1 can be the same or proportional to the short circuit current Isc, depending on the setting of the representative voltage V_IinREF. The current I1 flows through a current-to-voltage conversion circuit 82 which can be embodied simply by a resistor, or by other more complicated circuit, to convert the current I1 to the representative voltage V_IinREF. In this embodiment, the relationship between the short circuit current Isc and the representative voltage V_IinREF can be set by the ratio between the reference photovoltaic device group 21A and the photovoltaic device group 21, the mirror ratio of the current mirror 81, and/or the conversion ratio of the current-to-voltage conversion circuit 82. Note that the voltage Vg1 across the transistor M1 of the current mirror 81 is an ignorable low voltage when considering the I-V curve of the reference photovoltaic device group 21A, so the output current of the reference photovoltaic device group 21A is almost equal to its short circuit current Isc. If the current is sensed by a resistor and the voltage across the resistor is amplified by an amplifier, the effect of the voltage across the transistor M1 can be further reduced. To sense a current by a resistor and amplify the voltage across the resistor is a well-known circuit, so its details are omitted.

Figure 16:
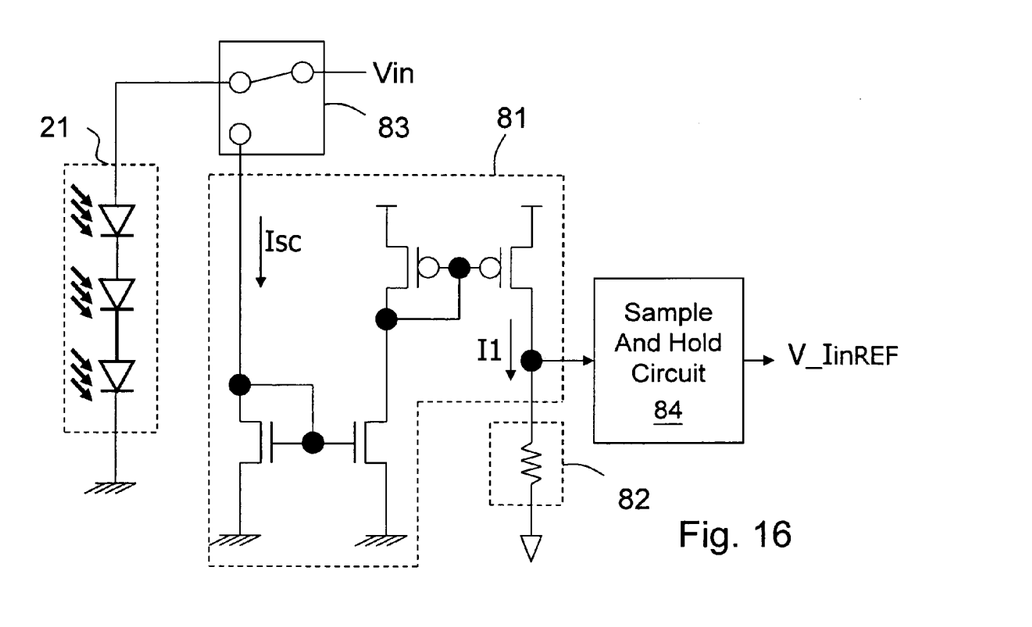

FIG. 16 shows another embodiment according to the present invention, in which additional reference photovoltaic device group 21A is not required. Instead, under normal operation, the photovoltaic device group 21 generates the input voltage Vin which is supplied to the photovoltaic power circuit, and a switch circuit 83 intermittently connects the photovoltaic device group 21 to ground through the current mirror 81, to obtain the short circuit current Isc. The short circuit current Isc is converted to a voltage signal in a manner similar to FIG. 15. This voltage signal is stored in a sample and hold circuit 84, and outputted as the representative voltage V_IinREF.

Besides the embodiments shown in FIGS. 15 and 16, there are many other ways to obtain the representative voltage V_IinREF according to the short circuit current Isc of the photovoltaic device group 21. If there is a stable light source and the short circuit current Isc is known and does not change too much, the value of the voltage V_IinREF can even be set as one or multiple fixed value during circuit design.

In summary, in order to obtain the precise MPP, prior art circuits requires complicated digital calculation circuits to calculate precise current and voltage values, which requires transistors in the number of several tens of thousands; however, the analog circuit according to the present invention only requires less than one thousandth of transistors in number as compared with prior art. Thus, the present invention is apparently much more advantageous than prior art.

The spirit of the present invention has been explained in the foregoing with reference to the preferred embodiments, but it should be noted that the above is only for illustrative purpose, to help those skilled in this art to understand the present invention, not for limiting the scope of the present invention. Within the same spirit, various modifications and variations can be made by those skilled in this art. For example, additional devices may be interposed between any two devices shown in the drawings, such as a delay circuit, a switch, or a resistor, without affecting the primary function of the circuit. In view of the foregoing, it is intended that the present invention cover all such modifications and variations, which should interpreted to fall within the scope of the following claims and their equivalents.

What is claimed is:

1. An analog photovoltaic power circuit, comprising:
   a photovoltaic device group for receiving photo energy and generating an input voltage, the input voltage corresponding to an input current;
   a power stage for receiving the input voltage and generating an output voltage;
   an optimum current point estimation circuit estimating an optimum current point corresponding to an optimal power output point according to a direction of variation of the input current and a direction of variation of power generated by the photovoltaic device group; and
   an analog comparison and control circuit for controlling an operation of the power stage according to a comparison between the optimum current point estimated by the optimum current point estimation circuit and the input current.

2. The analog photovoltaic power circuit of claim 1, wherein the optimum current point estimation circuit includes a variable resistance device on which is generated a voltage indicating the optimum current point.

3. The analog photovoltaic power circuit of claim 2, wherein the optimum current point estimation circuit includes a direction comparison circuit for comparing the direction of variation of the input current and the direction of variation of the power generated by the photovoltaic device group, and controlling the variable resistance device according to the comparison result.

4. The analog photovoltaic power circuit of claim 1, wherein the direction comparison circuit includes:
   a first high-pass filter receiving a signal indicating the input current;
   a second high-pass filter receiving a signal indicating the power generated by the photovoltaic device group; and
   a slope direction comparison circuit comparing the outputs of the first and second high-pass filters.

5. The analog photovoltaic power circuit of claim 4, wherein the first and second high-pass filters are differential circuits.

6. The analog photovoltaic power circuit of claim 4, wherein the power stage supplies a voltage to a load, and wherein the signal indicating the power generated by the photovoltaic device group is obtained according to a power supplied to the load.

7. The analog photovoltaic power circuit of claim 4, wherein the power stage supplies a voltage to a load, and wherein the signal indicating the power generated by the photovoltaic device group is obtained according to a current supplied to the load.

8. The analog photovoltaic power circuit of claim 3, wherein the power stage supplies a voltage to a load, and wherein the analog photovoltaic power circuit further includes a power meter which measures a power supplied to the load and inputs the measured result to the direction comparison circuit.

9. The analog photovoltaic power circuit of claim 3, wherein the power stage supplies a voltage to a load, and wherein the analog photovoltaic power circuit further includes a power trend meter which measures a trend of a power supplied to the load and inputs the measured result to the direction comparison circuit.

10. The analog photovoltaic power circuit of claim 9, wherein the power trend meter estimates the power trend by sensing a heat on a resistor.

11. The analog photovoltaic power circuit of claim 3, wherein the power stage supplies a voltage to a load, and wherein the analog photovoltaic power circuit further includes a current meter which measures a current flowing to the load and inputs the measured result to the direction comparison circuit.

12. The analog photovoltaic power circuit of claim 1, wherein the optimum current point estimation circuit includes a variable voltage divider circuit receiving a predetermined voltage and dividing the predetermined voltage to obtain the optimum current point, wherein the predetermined voltage is a fixed voltage, a voltage taken from the photovoltaic device group, a voltage taken from a reference photovoltaic device group, or a predetermined voltage corresponding to a short-circuit current of the photovoltaic device group.

13. An analog photovoltaic power circuit, comprising:
   a photovoltaic device group for receiving photo energy and generating an input voltage, the input voltage corresponding to an input current;
   a power stage for receiving the input voltage and generating an output voltage;
   an optimum voltage point estimation circuit estimating the optimum voltage point corresponding to an optimal power output point according to a direction of variation of the input current and a direction of variation of power generated by the photovoltaic device group; and
   an analog comparison and control circuit for controlling an operation of the power stage according to a comparison between the optimum voltage point and the input voltage.

14. The analog photovoltaic power circuit of claim 13, wherein the optimum voltage point estimation circuit includes a variable resistance device on which is generated a voltage indicating the optimum voltage point.

15. The analog photovoltaic power circuit of claim 14, wherein the optimum voltage point estimation circuit includes a direction comparison circuit for comparing the direction of variation of the input current and the direction of variation of the power generated by the photovoltaic device group, and controlling the variable resistance device according to the comparison result.

16. The analog photovoltaic power circuit of claim 15, wherein the direction comparison circuit includes:
   a first high-pass filter receiving a signal indicating the input current;
   a second high-pass filter receiving a signal indicating the power generated by the photovoltaic device group; and
   a slope direction comparison circuit comparing the outputs of the first and second high-pass filters.

17. The analog photovoltaic power circuit of claim 16, wherein the first and second high-pass filters are differential circuits.

18. The analog photovoltaic power circuit of claim 16, wherein the power stage supplies a voltage to a load, and wherein the signal indicating the power generated by the photovoltaic device group is obtained according to a power supplied to the load.

19. The analog photovoltaic power circuit of claim 16, wherein the power stage supplies a voltage to a load, and wherein the signal indicating the power generated by the photovoltaic device group is obtained according to a current supplied to the load.

20. The analog photovoltaic power circuit of claim 15, wherein the power stage supplies a voltage to a load, and wherein the analog photovoltaic power circuit further includes a power meter which measures a power supplied to the load and inputs the measured result to the direction comparison circuit.

21. The analog photovoltaic power circuit of claim 15, wherein the power stage supplies a voltage to a load, and wherein the analog photovoltaic power circuit further includes a power trend meter which measures a trend of a power supplied to the load and inputs the measured result to the direction comparison circuit.

22. The analog photovoltaic power circuit of claim 21, wherein the power trend meter estimates the power trend by sensing a heat on a resistor.

23. The analog photovoltaic power circuit of claim 15, wherein the power stage supplies a voltage to a load, and wherein the analog photovoltaic power circuit further includes a current meter which measures a current flowing to the load and inputs the measured result to the direction comparison circuit.

24. The analog photovoltaic power circuit of claim 13, wherein the optimum current point estimation circuit includes a variable voltage divider circuit receiving a predetermined voltage and dividing the predetermined voltage to obtain the optimum voltage point, wherein the predetermined voltage is a fixed voltage, a voltage taken from the photovoltaic device group, or a voltage taken from a reference photovoltaic device group, predetermined voltage corresponding to a short-circuit current of the photovoltaic device group.

25. An analog photovoltaic power circuit, comprising:
a photovoltaic device group for receiving photo energy and generating an input voltage, the input voltage corresponding to an input current;
a power stage for converting the input voltage to an output voltage which is supplied to a load;
an optimum current point estimation circuit receiving a predetermined voltage, and estimating an optimum current point corresponding to an optimal power output point according to a direction of variation of the input current and a direction of variation of power generated by the photovoltaic device group, wherein the direction of variation of power is obtained from a power-variation-direction indication circuit which generates a signal indicating the direction of variation of the power; and
an analog comparison and control circuit for controlling an operation of the power stage according to a comparison between the optimum current point estimated by the optimum current point estimation circuit and the input current.

26. The analog photovoltaic power circuit of claim 25, wherein the signal indicating the direction of variation of the power is a digital signal which indicates the plus or minus sign of $d(V*I)/dt$, in which $d(V*I)$ is a difference of the power, and dt is a difference of time.

27. The analog photovoltaic power circuit of claim 25, wherein the power-variation-direction indication circuit includes:
a first RC circuit receiving a first delay signal related to a current supplied to the load;
a second RC circuit receiving a second delay signal related to the output voltage supplied to the load; and
an analog circuit determining the direction of variation of the power according to the first delay signal, the second delay signal, a signal related to the current supplied to the load and a signal related to the output voltage supplied to the load.

28. The analog photovoltaic power circuit of claim 27, wherein the analog circuit includes:
a first analog multiplier for generating a first derived signal related to a product of the current and the output voltage supplied to the load;
a second analog multiplier for generating a second derived signal related to a product of the first delay signal and the second delay signal; and
a summing node for comparing the first derived signal and the second derived signal to determine the direction of variation of the power.

29. An analog photovoltaic power circuit, comprising:
a photovoltaic device group for receiving photo energy and generating an input voltage, the input voltage corresponding to input current;
a power stage for converting the input voltage to an output voltage which is supplied to a load;
an optimum voltage point estimation circuit receiving a predetermined voltage, and estimating an optimum voltage point corresponding to an optimal power output point according to a direction of variation of the input current and a direction of variation of power generated by the photovoltaic device group, wherein the direction of variation of the power is obtained from a power-variation-direction indication circuit which generates a signal indicating the direction of variation of the power; and
an analog comparison and control circuit for controlling an operation of the power stage according to a comparison between the optimum voltage point and the input voltage.

30. The analog photovoltaic power circuit of claim 29, wherein the signal indicating the direction of variation of the power is a digital signal which indicates the plus or minus sign of $d(V*X)/dt$, in which $d(V*I)$ is a difference of the power, and dt is a difference of time.

31. The analog photovoltaic power circuit of claim 29, wherein the power-variation-direction indication circuit includes:
a first RC circuit receiving a first delay signal related to a current supplied to the load;
a second RC circuit receiving a second delay signal related to the output voltage supplied to the load; and
an analog circuit determining the direction of variation of power according to the first delay signal, the second delay signal, a signal related to the current supplied to the load and a signal related to the output voltage supplied to the load.

32. The analog photovoltaic power circuit of claim 31, wherein the analog circuit includes:
a first analog multiplier for generating a first derived signal related to a product of the current and the output voltage supplied to the load;
a second analog multiplier for generating a second derived signal related to a product of the first delay signal and the second delay signal; and
a summing node for comparing the first derived signal and the second derived signal to determine the direction of variation of the power.

* * * * *